(12) United States Patent
Villien et al.

(10) Patent No.: US 11,892,296 B2
(45) Date of Patent: Feb. 6, 2024

(54) METHOD FOR DETERMINING THE POSITION AND THE ORIENTATION OF A VEHICLE

(71) Applicant: Commissariat à l'Energie Atomique et aux Energies Alternatives, Paris (FR)

(72) Inventors: Christophe Villien, Grenoble (FR); Christophe Combettes, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 17/447,140

(22) Filed: Sep. 8, 2021

(65) Prior Publication Data

US 2022/0074747 A1 Mar. 10, 2022

(30) Foreign Application Priority Data

Sep. 9, 2020 (FR) ...................................... 20 09131

(51) Int. Cl.
*G01C 21/16* (2006.01)
(52) U.S. Cl.
CPC .................................... *G01C 21/16* (2013.01)
(58) Field of Classification Search
CPC ....................................................... G01C 21/16
See application file for complete search history.

(56) References Cited

U.S. PATENT DOCUMENTS 8,843,290 B2   9/2014  Kulik et al.
8,914,196 B1 * 12/2014  Breed ................. B60R 21/0132
                                                        701/32.4
(Continued)

FOREIGN PATENT DOCUMENTS

CN        110988951 A     4/2020
WO    WO 2011/160213 A1  12/2011

OTHER PUBLICATIONS

Zhang et al(Unmanned ground vehicle positioning system by GPS/dead-reekoning/IMU sensor fusion, 2nd Annual International Conference on Electronics, Electrical Engineering and Information Science (EEEIS 2016)) (Year: 2016).*

(Continued)

*Primary Examiner* — John E Breene
*Assistant Examiner* — Aeysha N Sultana
(74) *Attorney, Agent, or Firm* — Oblon, McClelland, Maier & Neustadt, L.L.P.

(57) ABSTRACT

A method for determining the position and orientation of a vehicle includes constructing, for several instants $t_k$ ranging between instants $t_{o_{j-1}}$ and $t_{o_j}$, an estimate of the instantaneous value of the physical quantity on the basis of the measurements of an inertial navigation unit; constructing an estimate of the physical quantity for the instant $t_{o_j}$ by computing the arithmetic mean of the constructed instantaneous values; computing a deviation between a measurement of the physical quantity obtained on the basis of the measurement of an odometer and an estimate of the physical quantity at the instant $t_{o_j}$; and correcting, as a function of the deviation computed for the instant $t_{o_j}$, estimated positions and orientations of the vehicle, in order to obtain a corrected position and a corrected orientation.

9 Claims, 3 Drawing Sheets

(56) References Cited

U.S. PATENT DOCUMENTS

| | | | |
|---|---|---|---|
| 10,234,292 B2* | 3/2019 | Palella | G01C 22/00 |
| 2006/0247847 A1* | 11/2006 | Carter | B60T 7/18 |
| | | | 701/498 |
| 2008/0129586 A1* | 6/2008 | Martin | G01S 19/43 |
| | | | 342/357.3 |
| 2011/0121068 A1* | 5/2011 | Emanuel | B66F 9/0755 |
| | | | 235/375 |
| 2017/0122770 A1 | 5/2017 | Steinhardt | |
| 2017/0199040 A1* | 7/2017 | Willis | G01C 21/26 |
| 2018/0087905 A1 | 3/2018 | Chekanov et al. | |
| 2018/0227853 A1 | 8/2018 | Kench et al. | |
| 2019/0302272 A1 | 10/2019 | Balog et al. | |

OTHER PUBLICATIONS

French Preliminary Search Report dated May 4, 2021 in French Application 20 09131 filed on Sep. 9, 2020, 10 pages (with English Translation of Categories of Cited Documents & Written Opinion).

Zhou et al., "Kinematic Measurement of the Railway Track Centerline Position by GNSS/INS/ Odometer Integration", IEEE Access, 2019, 13 pages.

Vavilova et al., "Development of a Low-Cost INS/GNSS/Odometer Integration Algorithm for a Road Surface Testing Laboratory Software", Proceedings of the 6$^{th}$ Saint Petersburg International Conference on Integrated Navigation Systems, 2019, 7 pages.

Reimer et al., "INS/GNSS/Odometer Data Fusion in Railway Applications", 2016 DGON Inertial Sensors and Systems (ISS)2016, 14 pages.

Moussa et al., "Multiple Ultrasonic Aiding System for Car Navigation in GNSS Denied Environment", 2018 IEEE/ION Position, Location and Navigation Symposium (PLANS), 2018, 8 pages.

Vagle et al., "Multiantenna GNSS and Inertial Sensors/Odometer Coupling for Robust Vehicular Navigation", IEEE Internet of Things Journal, vol. 5, No. 6, Dec. 2018, 13 pages.

Croci et al., "A GNSS/INS-based Architecture for Rescue Team Monitoring", 2010 International Conference on Indoor Positioning and Indoor Navigation (IPIN), Sep. 2010, 7 pages.

Sun et al., "An On-line Calibration Method of SINS/Odometer Integrated Navigation System", 2017 4th International Conference on Information Science and Control Engineering, 2017, 5 pages Jiang et al., "Grey Theory Based Odometer Scale Factor Calibration Method for Integrated Navigation System", 2009 Second International Conference on Intelligent Computation Technology and Automation, 2009, 4 pages.

Wei et al., "Vehicle INS/Odometer Integrated Navigation Algorithm Based on Factor Graph", 2019 IEEE International Conference on Unmanned Systems (ICUS), 2019, 5 pages.

Gopaul et al., "Discrete EKF With Pairwise Time Correlated Measurement Noise for Image-Aided Inertial Integrated Navigation", CPGPS 2017 Forum on Cooperative Positioning and Service, ISPRS Technical Commission II Symgosium, 2014, 6 pages.

Wang et al., "The practical approaches to Kalman filtering with time-correlated measurement errors", IEEE Transactions on Aerospace and Electronic Systems, vol. 48, No. 2, 2012, 25 pages.

Godha, Performance Evaluation of Low Cost MEMS-Based IMU Integrated With GPS for Land Vehicle Navigation Application, PhD report, 2006, 230 pages.

* cited by examiner

METHOD FOR DETERMINING THE POSITION AND THE ORIENTATION OF A VEHICLE

The invention relates to a method for determining the position and the orientation of a vehicle. The invention also relates to an information recording medium and a location system for implementing this method.

Numerous methods for determining the position and the orientation of a vehicle are known. For example, a presentation of the prior art in the field can be found in the following thesis: S. Godha, "*Performance Evaluation of Low Cost MEMS-Based IMU Integrated With GPS for Land Vehicle Navigation Application*", PhD report, 2006. Hereafter, this thesis is referred to as "Godha2006".

Conventionally, an inertial measurement integration module constructs an estimated position $P_e$ and an estimated orientation $O_e$ of the vehicle on the basis of:

measurements from an accelerometer and from a gyrometer on board the vehicle; and the previous position and the previous orientation determined for this vehicle.

Subsequently, this estimated position $P_e$ and this estimated orientation $O_e$ are corrected by a correction module in order to obtain a corrected position $P_c$ and a corrected orientation $O_c$. The corrected position $P_c$ and the corrected orientation $O_c$ are more precise and are delivered on an output of the location system as a determined position and orientation for the vehicle. This corrected position $P_c$ and this corrected orientation $O_c$ are also acquired by the integration module, and then used by this integration module as the previous position and the previous orientation, respectively, in order to construct the next estimated positions and orientations of the vehicle.

The correction module corrects the position $P_e$ and the orientation $O_e$ by taking into account measurements from sensors other than those from the on-board accelerometer and gyrometer. In particular, the measurements from an odometer and, optionally, the measurements from other sensors, such as a satellite geolocation unit, are used by the correction module to this end.

Typically, the correction module corrects the position $P_e$ and the orientation $O_e$ as a function of a deviation between the measurement of the odometer at an instant to$_j$ and an estimate of this measurement at the instant to$_j$ obtained on the basis of the measurements of the accelerometer and of the gyrometer recorded at this instant to$_j$.

Such prior art is disclosed, for example, in US2017/122770A1, US2018/087905A1 or CN110988951A.

The aim of the invention is to improve these known methods for determining the position and the orientation of the vehicle in order to improve the precision of the position and of the orientation of the vehicle that are determined by such a system.

Therefore, the aim of the invention is a method for determining the position and the orientation of a vehicle.

A further aim of the invention is a microprocessor-readable information recording medium comprising instructions for carrying out the above method, when these instructions are executed by a microprocessor.

Finally, a further aim of the invention is a location system implementing the claimed method.

The invention will be better understood from reading the following description, which is provided solely by way of a non-limiting example and with reference to the drawings, in which.

Throughout these figures, the same reference signs are used to denote the same elements.

Throughout the remainder of this description, the features and functions that are well known to a person skilled in the art are not described in detail. In particular, with respect to the general knowledge of a person skilled in the art relating to the systems for locating a vehicle using an inertial navigation unit, reference should be made to the Godha2006 thesis, for example.

Throughout this description, a detailed embodiment is firstly described in chapter I with reference to the figures. Subsequently, in the next chapter, chapter II, variants of this embodiment are presented. Finally, the advantages of the various embodiments are presented in chapter III.

Chapter 1: Embodiment

Figure 1:
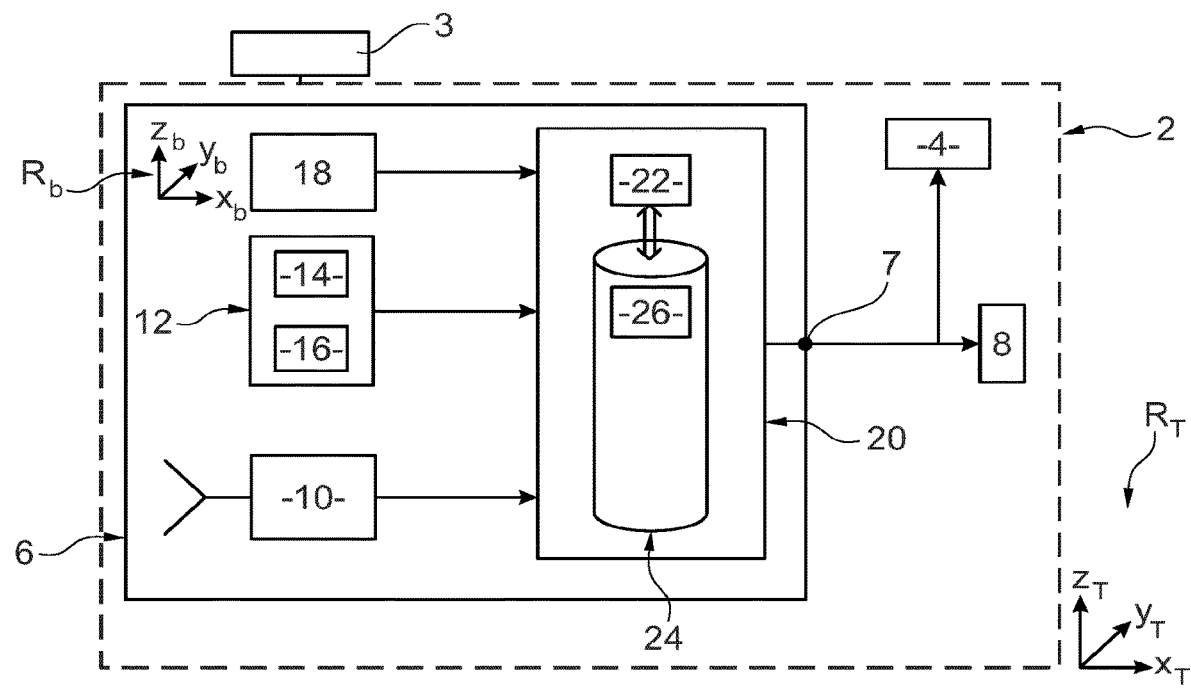
FIG. 1 is a schematic illustration of a system for locating a vehicle.

FIG. 1 shows a motor vehicle 2 capable of driving over ground such as a road, for example. To this end, it typically comprises wheels or tracks. In this case, the vehicle 2 comprises a wheel 3 that runs over the ground on which the vehicle 2 moves. In this example, the wheel 3 is a wheel of the vehicle 2 that cannot be turned. For example, it is a rear wheel of the vehicle 2. The vehicle 2 is also equipped with propulsion means 4, such as an engine that drives the wheels or the tracks.

The vehicle 2 is equipped with a system 6 for locating this vehicle. This system 6 is capable of determining the position, the orientation and the speed of the vehicle 2 in a land coordinate system $R_T$. In this case, the land coordinate system $R_T$ is set without any degree of freedom to the earth. The coordinate system $R_T$ comprises three axes that are typically orthogonal to each other. For example, in this case, the coordinate system $R_T$ is the coordinate system known as the ECEF ("Earth-Centered, Earth-Fixed") coordinate system.

A movable coordinate system $R_b$ is also set without any degree of freedom to the vehicle 2. This coordinate system $R_b$ comprises three axes that are orthogonal to each other, respectively denoted $x_b$, $y_b$ and $z_b$. Conventionally, when the vehicle 2 moves horizontally, the axes $x_b$ and $y_b$ are in a horizontal plane and the axis $z_b$ is vertical. In this case, the axis $x_b$ is oriented and points in the direction towards which the vehicle moves when it moves forward.

In this case, the position of the vehicle 2 in the coordinate system $R_T$ is expressed by coordinates of the origin of the coordinate system $R_b$ in the coordinate system $R_T$.

The orientation of the vehicle 2 is expressed by the yaw angle $\psi$, the pitch angle $\theta$ and the roll angle $\varphi$ of the coordinate system $R_b$ defined in relation to a coordinate system, called "navigation" coordinate system. In practice, most often, the orientation of the vehicle is in the form of an orientation matrix, from which it is possible to deduce the yaw angle, the pitch angle and the roll angle of the vehicle. The orientation of the vehicle also can be in the form of a vector directly comprising the yaw angle, the pitch angle and the roll angle of the vehicle. Hereafter, these two scenarios will be considered to be equivalent and therefore the orientation of the 100 vehicle will be considered to comprise the yaw angle, the pitch angle and the roll angle of the vehicle from the time when these three angles can be directly deduced from a matrix or a vector.

The position, the orientation and the speed determined by the system 6 are delivered on an output 7. Hereafter, the position, the orientation and the speed 105 delivered on the output 7 by the system 6 for an instant $t_k$ are respectively denoted P(k), O(k) and V(k).

Typically, the vehicle 2 comprises a control station 8 for guiding or assisting the guidance of the vehicle 2 towards a predefined destination. The station 8 is connected to the output 7. The station 8 can be a manual and/or automatic control station. In the case of a manual control station, the determined position, orientation and speed are transmitted to a human-machine interface to help a human being to control propulsion means 4. In the case of an automatic control station, the determined position, orientation and speed are automatically converted into commands for controlling propulsion means 4, and then automatically transmitted to these propulsion means 4.

The system 6 comprises a satellite geolocation unit 10, an inertial measurement unit 12 and an odometer 18.

The unit 10 is known under the acronym GNSS ("Global Navigation Satellite System"). Based on the satellite signals that it receives, the unit 10 generates signals representing the position and the speed of the vehicle in the coordinate system $R_T$. The unit 10 updates its measurements at a frequency $F_{10}$. Conventionally, the frequency $F_{10}$ ranges between 0.1 Hz and 20 Hz.

The unit 12 is known under the acronym IMU ("Inertial Measurement Unit"). The unit 12 notably comprises a triaxial accelerometer 14 and a triaxial gyrometer 16. By virtue of these sensors, the unit 12 is capable of measuring the variation of the orientation, of the position and of the speed of the vehicle 2. In this case, the measurement axes of the accelerometer 14 and of the gyrometer 16 are respectively coincident with the axes $x_b$, $y_b$ and $z_b$ of the coordinate system $R_b$. Furthermore, the accelerometer 14 is arranged so that a positive measurement of the acceleration of the vehicle 2 along the axis $x_b$ means that the vehicle 2 accelerates by moving forward.

The unit 12 updates the measurements of the acceleration and of the speed at a high frequency $F_{12}$. Conventionally, the frequency $F_{12}$ ranges between 20 Hz and 2,000 Hz. For example, in this case, the frequency $F_{12}$ is equal to 200 Hz.

The odometer 18 measures the angular speed of the wheel 3 around its axis of rotation on which it is centred. To this end, the odometer 18 measures the angular movement of the wheel 3 during a known interval $[t_{ini}; t_{end}]$. This angular movement is equal to the deviation between the angular position of the wheel 3 at the instant $t_{ini}$ and the angular position of the wheel 3 at the current measurement instant $t_{end}$. Thus, the ratio of the angular movement measured at the instant $t_{end}$ to the duration of the interval $[t_{ini}; t_{end}]$ provides the angular speed of the wheel 3 at the instant $t_{end}$. The angular speed measured by this odometer 18 is therefore an average angular speed over the interval $[t_{ini}; t_{end}]$.

The duration of the interval $[t_{ini}; t_{end}]$ is known. In this case, the duration of the interval $[t_{ini}; t_{end}]$ is constant and equal to a period $T_{18}$. Typically, the instant $t_{ini}$ is the previous measurement instant of the angular speed of the wheel 3. The odometer 18 updates its measurements at a frequency $F_{18}$. The frequency $F_{18}$ is less than the frequency $F_{12}$. Typically, the frequency $F_{18}$ is ten or fifty times less than the frequency $F_{12}$. Conventionally, the frequency $F_{18}$ ranges between 0.1 Hz and 20 Hz. In this case, the frequency $F_{18}$ is equal to 1 Hz.

The odometer 18 is located, for example, in the vicinity of the wheel 3 for which it measures the angular speed.

In order to determine the position, the orientation and the speed of the vehicle 2 on the basis of the measurements of the units 10 and 12 and of the odometer 18, the system 6 comprises a programmable electronic computer 20. This computer 20 is capable of acquiring the measurements of the units 10 and 12 and of the odometer 18. Subsequently, on the basis of these measurements, the computer 20 determines the position, the orientation and the speed of the vehicle 2 in the coordinate system $R_T$. The computer 20 comprises a microprocessor 22 and a memory 24 comprising the instructions and the data required to implement the method described with reference to FIG. 3.

More specifically, the memory 24 comprises the instructions of a software module 26 capable of determining the position, the orientation and the speed of the vehicle 2 on the basis of the measurements acquired when it is executed by the microprocessor 22. The module 26 notably implements a merge algorithm that establishes, on the basis of a previous estimate of the position, of the orientation and of the speed of the vehicle 2 and of new measurements acquired from this previous estimate, a new estimate of the position, of the orientation and of the speed of the vehicle 2. Typically, the merge algorithm also establishes margins of error on each new estimate.

The general principles of the merge algorithms are well known to a person skilled in the art. For example, an interested reader can once again refer to the aforementioned Godha2006 thesis. Typically, this merge algorithm implements one or more Kalman filter(s). In this case, the module 26 implements an architecture known as "closed loop" architecture ("closed loop integration scheme" or "closed loop approach").

Figure 2:
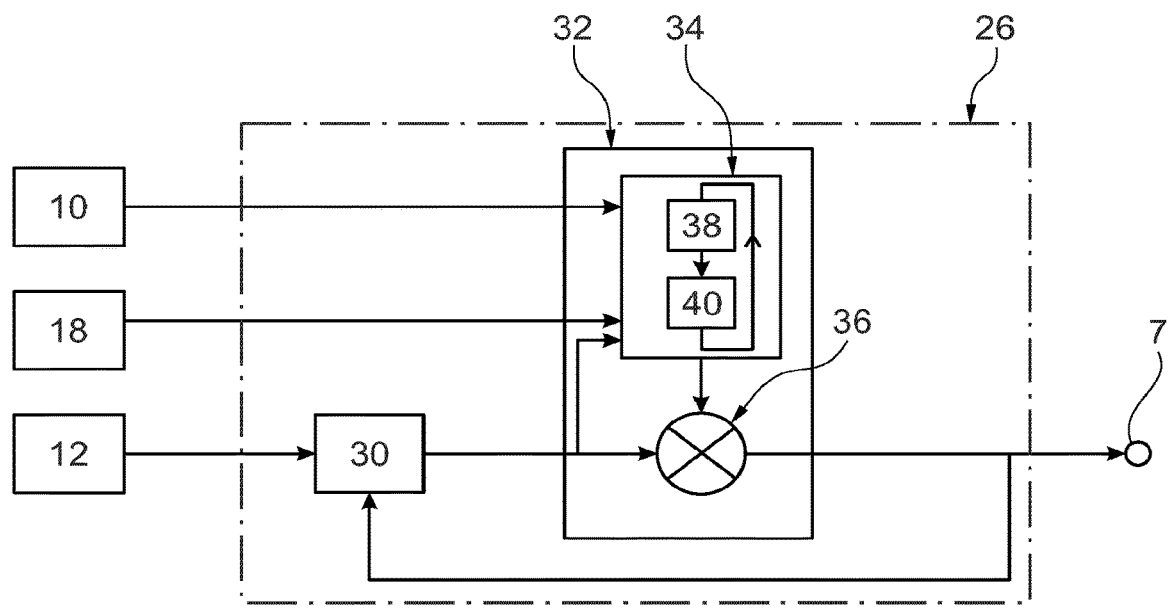
FIG. 2 is a schematic illustration of various software modules implemented in the system of FIG. 1.

FIG. 2 shows the architecture of the module 26 in greater detail. The module 26 comprises an inertial measurement integration sub-module 30 and a correction sub-module 32. The general operating principles of these sub-modules 30 and 32 are known. For example, for a detailed description of these general principles, the reader can consult chapter 4 of the Godha2006 thesis. Thus, hereafter, only the details specific to the invention are described in detail.

The sub-module 30 is known as "mechanization". For each instant $t_k$, the sub-module 30 constructs a rough estimate of a position $P_e(k)$, of an orientation $O_e(k)$ and of a speed $V_e(k)$ of the vehicle 2. Throughout this document, the symbol "k" is the order number of the instant $t_k$ in the temporally ordered series $\{0, t_1, t_2, \ldots, t_{k-1}, t_k, \ldots\}$ of instants $t_k$. k−1 denotes the order number of the instant $t_{k-1}$ immediately preceding the instant $t_k$. Each position $P_e(k)$, orientation $O_e(k)$ and speed $V_e(k)$ of the vehicle 2 is a vector comprising three coordinates. The coordinates of the position $P_e(k)$ in the coordinate system $R_T$ are denoted $x_e(k)$, $y_e(k)$ and $z_e(k)$. The coordinates of the orientation $O_e(k)$ are denoted $\psi_e(k)$, $\theta_e(k)$ and $\varphi_e(k)$ and the coordinates of the speed $V_e(k)$ are denoted $Vx_e(k)$, $Vy_e(k)$ and $Vz_e(k)$.

The frequency of the instants $t_k$ is less than or equal to the frequency $F_{12}$. In this case, the frequency of the instants $t_k$ is equal to the frequency $F_{12}$.

The sub-module 30 constructs the position $P_e(k)$, the orientation $O_e(k)$ and the speed $V_e(k)$ on the basis of:

the previous position P(k−1), the previous orientation O(k−1) and the previous speed V(k−1) determined for the vehicle 2 at the instant $t_{k-1}$ by the system 6 and delivered on the output 7; and the measurements of the accelerometer 14 and of the gyrometer 16 acquired by the sub-module 30 at the instant $t_k$.

The combination of the sub-module 30 and of the unit 12 forms what is known under the acronym INS ("Inertial Navigation System").

At certain particular instants $t_k$, the sub-module 32 corrects the position $P_e(k)$, the orientation $O_e(k)$ and the speed $V_e(k)$ constructed by the sub-module 30 for this instant $t_k$, in order to obtain a corrected position $P_c(k)$, a corrected orientation $O_c(k)$ and a corrected speed $V_c(k)$ for this instant $t_k$. Hereafter, these particular instants $t_k$ are called "instants $t_m$". The symbol "m" is equal to the order number of the instant $t_k$ in the series $\{0, t_1, t_2, \ldots, t_{k-1}, t_k, \ldots\}$. Each order number m is therefore equal to a respective order number k. Thus, the position $P_e(m)$, the orientation $O_e(m)$ and the speed $V_e(m)$ are respectively equal to the position $P_e(k)$, the orientation $O_e(k)$ and the speed $V_e(k)$ constructed for the instant $t_k$ equal to the instant $t_m$. The series $\{0, t_1, t_2, \ldots, t_{m-1}, t_m, \ldots\}$ of the instants $t_m$ is a sub-set of the series $\{0, t_1, t_2, \ldots, t_{k-1}, t_k, \ldots\}$. Thus, the correction by the sub-module 32 is not carried out for each instant $t_k$, but only for some of them. At each instant $t_m$, the sub-module 32 combines the position $P_e(m)$, the orientation $O_e(m)$ and the speed $V_e(m)$ with respective correction coefficients in order to obtain the corrected position $P_c(m)$, the corrected orientation $O_c(m)$ and the corrected speed $V_c(m)$. At the instants $t_m$, it is the corrected position $P_c(m)$, the corrected orientation $O_c(m)$ and the corrected speed $V_c(m)$ that are delivered on the output 7 and not the position $P_e(m)$, the orientation $O_e(m)$ and the speed $V_e(m)$. The correction coefficients are updated as a function of the measurements of the unit 10 and of the odometer 18. Therefore, the correction coefficients are updated at a frequency that is less than the frequency $F_{12}$.

The sub-module 32 acquires the measurements from the unit 10 at a frequency that is less than or equal to the frequency $F_{12}$. In this case, the acquisition frequency of the measurements of the unit 10 is equal to the frequency $F_{10}$. Hereafter, $tg_i$ denotes the acquisition instants of a new measurement of the unit 10. These instants $tg_i$ form a temporally ordered series $\{0, tg_1, tg_2, \ldots, tg_{i-1}, tg_i, \ldots\}$ of instants $tg_i$. The symbol "i" denotes the order number of the instant $tg_i$ in this series. The sub-module 32 implements the correction coefficients each time that a new measurement of the unit 10 is acquired, and therefore for each instant $tg_i$. The instants $tg_i$ are less frequent than the instants $t_k$.

The sub-module 32 also acquires the measurements from the odometer 18 at a frequency that is less than or equal to the frequency $F_{12}$. In this case, the acquisition frequency of the measurements of the odometer 18 is equal to the frequency $F_{18}$. Hereafter, $to_j$ denotes the acquisition instants of a new measurement of the odometer 18. The symbol "j" is the order number of the instant $to_j$ in the temporally ordered series $\{0, to_1, to_2, \ldots, to_{j-1}, to_j, \ldots\}$ of instants $to_j$. The sub-module 32 also updates the correction coefficients each time that a new measurement of the odometer 18 is acquired, and therefore for each instant $to_j$. Since the frequency $F_{18}$ is less than the frequency $F_{12}$, several instants $t_k$ systematically exist between the instants $to_{j-1}$ and $to_j$.

Hereafter, the series $\{0, tg_1, tg_2, \ldots, tg_{i-1}, tg_i, \ldots\}$ and $\{0, to_1, to_2, \ldots to_{j-1}, to_j, \ldots\}$ are both considered to be sub-sets of the series $\{0, t_1, t_2, \ldots, t_{k-1}, t_k, \ldots\}$. Thus, each instant $tg_i$ and $to_j$ corresponds to a respective instant $t_k$ of the series $\{0, t_1, t_2, \ldots, t_{k-1}, t_k, \ldots\}$. Furthermore, in this embodiment, the instants $tg_i$ and $to_j$ are separate. In other words, at an instant $tg_i$ where the measurement of the unit 10 is acquired, no measurement of the odometer 18 is acquired, and vice versa. Finally, in this document, the instants $t_m$ are equal to the instants at which the sub-module 32 acquires either a measurement from the unit 10 or a measurement from the odometer 18.

In order to update the correction coefficients as a function of the measurements of the unit 10 and of the odometer 18, the sub-module 32 comprises a Kalman filter 34. In order to combine the correction coefficients with the rough estimates delivered by the sub-module 30, the sub-module 32 also comprises an adder 36.

In this case, the filter 34 is known under the acronym ESKF (Error-State Kalman Filter) since it estimates corrections to be made to the position, the orientation and the speed estimated by the sub-module 30. More specifically, the filter 34 provides a state vector $X_{m|m}$ for each instant $t_m$. The state vector $X_{m|m}$ notably contains the correction coefficients to be used to correct the position $P_e(m)$, the orientation $O_e(m)$ and the speed $V_e(m)$. For each instant $t_m$, the adder 36 combines the correction coefficients provided by the filter 34 with the position $P_e(m)$, the orientation $O_e(m)$ and the speed $V_e(m)$ in order to obtain the corrected position $P_c(m)$, the corrected orientation $O_c(m)$ and the corrected speed $V_c(m)$. For each instant $t_k$ following the instant $t_m$ and before the instant $t_{m+1}$, no correction is made to the estimates constructed by the sub-module 30.

For example, in this case, the state vector $X_{m|m}$ contains correction coefficients $\delta_x(m)$, $\delta_y(m)$ and $\delta_z(m)$ of the coordinates, respectively $x_e(m)$, $y_e(m)$ and $z_e(m)$ of the position $P_e(m)$. The adder 36 adds these coefficients $\delta_x(m)$, $\delta_y(m)$ and $\delta_z(m)$, respectively, to the coordinates $x_e(m)$, $y_e(m)$ and $z_e(m)$ in order to obtain the coordinates $x_c(m)$, $y_c(m)$ and $z_c(m)$, respectively, of the corrected position $P_c(m)$.

The state vector $X_{m|m}$ also comprises correction coefficients $\delta_\psi(m)$, $\delta_\theta(m)$ and $\delta_\varphi(m)$, respectively, of the coordinates $\psi_e(m)$, $\theta_e(m)$ and $\varphi_e(m)$ of the orientation $O_e(m)$. The adder 36 adds these coefficients $\delta_\psi(m)$, $\delta_\theta(m)$ and $\delta_\varphi(m)$, respectively, to the coordinates $\psi_e(m)$, $\theta_e(m)$ and $\varphi_e(m)$ in order to obtain the corrected coordinates $\psi_c(m)$, $\theta_c(m)$ and $\varphi_c(m)$, respectively, of the orientation $O_c(m)$.

Similarly, the state vector $X_{m|m}$ also comprises three correction coefficients $\delta v_x(m)$, $\delta v_y(m)$ and $\delta v_z(m)$ used to respectively correct the coordinates $Vx_e(m)$, $Vy_e(m)$ and $Vz_e(m)$ of the speed $V_e(m)$.

Conventionally, the state vector $X_{m|m}$ also comprises correction coefficients for correcting other parameters, such as measurement biases of the accelerometer 14 and of the gyrometer 16, or others. In this embodiment, the state vector $X_{m|m}$ also contains:

three correction coefficients $\delta ba_x(m)$, $\delta ba_y(m)$ and $\delta ba_z(m)$ for correcting the measurement biases of the accelerometer 14 in the directions $x_b$, $y_b$ and $z_b$, respectively;

three correction coefficients $\delta bg_x(m)$, $\delta bg_y(m)$ and $\delta bg_z(m)$ for correcting the measurement biases of the gyrometer 16 around axes respectively parallel to the directions $x_b$, $y_b$ and $z_b$: and a correction coefficient $\delta_{Sr}(m)$ of a scale factor $S_r$.

The scale factor $S_r$ allows the angular speed of the wheel 3 measured by the odometer 18 to be converted into a linear movement speed of this wheel. The linear movement speed of the wheel 3 corresponds to the linear speed of the contact point between the wheel 3 and the ground on which it runs. This scale factor $S_r$ notably depends on the radius of the wheel 3. As a first approximation, this scale factor $S_r$ is a constant. However, the radius of the wheel 3 can vary over time. For example, the wheel 3 is fitted with a tyre such that its radius varies as a function of the pressure of the tyre. The coefficient $\delta_{S_r}(m)$ allows these variations of the scale factor $S_r$ to be corrected.

In this embodiment, the state vector $X_{m|m}$ is therefore the following vector with sixteen coordinates: $[\delta_\psi(m), \delta_\theta(m), \delta_\varphi(m), \delta v_x(m), \delta v_y(m), \delta v_z(m), \delta_x(m), \delta_y(m), \delta_z(m), \delta ba_x(m), \delta ba_y(m), \delta ba_z(m), \delta bg_x(m), \delta bg_y(m), \delta bg_z(m), \delta_{S_r}(m)]^T$, where the symbol "T" is the symbol of the transposed operation.

The filter 34 is a recursive algorithm, which, for each instant $t_m$, provides the adder 36 with a new state vector $X_{m|m}$ computed on the basis of:
  the previous state vector $X_{m-1|m-1}$;
  the measurement of the unit 10 or of the odometer 18 acquired at the instant $t_m$; and
  the position $P_e(m)$, the orientation $O_e(m)$ and the speed $V_e(m)$ constructed by the sub-module 30 for the instant $t_m$.

Conventionally, the filter 34 comprises a prediction block 38 computing a first state vector $X_{m|m-1}$ on the basis of the vector $X_{m-1|m-1}$, followed by an updating block 40 computing the vector $X_{m|m}$ on the basis of the predicted vector $X_{m|m-1}$. These blocks are executed one after the other for each vector $X_{m|m}$.

More specifically, the block 38 constructs a prediction $X_{m|m-1}$ of the state vector on the basis of the previous state vector $X_{m-1|m-1}$.

In this case, an embodiment of the blocks 38 and 40 is described in the particular case where the filter 34 is an Extended Kalman Filter known under the algorithm "EKF".

The propagation or prediction equation of the state of the filter 34 implemented by the block 38 is defined by the following relation (1):

$$X_{m|m} = A_{m-1} X_{m-1|m-1},$$

where:
  $X_{m-1|m-1}$ is the estimate of the state vector at the instant $t_{m-1}$ obtained by taking into account all the measurements up until the instant $t_{m-1}$;
  $X_{m|m-1}$ is the prediction of the state vector at the instant $t_m$ obtained by taking into account all the measurements up until the instant $t_{m-1}$ and without taking into account the measurements acquired at the instant $t_m$; and
  $A_{m-1}$ is the state transition matrix at the instant $t_{m-1}$.

In the particular case described herein, where the filter 34 is an "Error State Kalman Filter", the vector $X_{m-1|m-1}$ is always zero, since it is assumed that the error was corrected beforehand. In other words, the relation (1) is reduced to the following relation: $X_{m|m-1}=0$.

The propagation or prediction equation of the covariance matrix of the error implemented by the block 38 is defined by the following relation (2):

$$P_{m|m-} = A_{m-1} P_{m-1|m-1} A_{m-1}^T + Q_{m-1},$$

where:
  $P_{m-1|m-1}$ is the estimate of the covariance matrix of the error at the instant $t_{m-1}$ obtained by taking into account all the measurements acquired up until the instant $t_{m-1}$;
  $P_{m|m-1}$ is the prediction of the covariance matrix $P_m$ at the instant $t_m$ obtained by only taking into account the measurements acquired up until the instant $t_{m-1}$; and
  $Q_{m-1}$ is the covariance matrix of the process noise v.

The block 40 corrects the prediction $X_{m|m-1}$ of the state vector so as to obtain the state vector $X_{m|m}$. The corrected vector $X_{m|m}$ is constructed as a function of a deviation $Y_m$ between:
  an estimate $\hat{z}_m$ of a physical quantity at the instant $t_m$; and
  the measurement $z_m$ of said physical quantity at the instant $t_m$.

The deviation $Y_m$ is known as "innovation". In this case, the measured physical quantities are the position and the speed measured by the unit 10 and, alternately, the speed $V_r$ of the wheel 3 obtained on the basis of the angular speed measured by the odometer 18. Thus, for each instant $tg_i$, the block 40 corrects the prediction $X_{m|m-1}$ only on the basis of the measurement of the unit 10 acquired at this instant $tg_i$. Reciprocally, for each instant $to_j$, the block 40 corrects the prediction $X_{m|m-1}$ only on the basis of the measurement of the odometer 18 acquired at this instant $to_j$. The correction of the prediction $X_{m|m-1}$, at the instants $tg_i$, as a function of the deviations in position and speed, is carried out conventionally. Thus, this functionality of the block 40 is not described in further detail. Only the correction of the prediction $X_{m|m-1}$, at the instants $to_j$, as a function of the measurement of the odometer 18, is described hereafter.

In this embodiment, the physical quantity is the speed $V_r$ of the wheel 3 in the direction $x_b$ of the coordinate system $R_b$. The measurement of this speed $V_r$ at the instant $t_m$ is constructed using the following relation (3):

$$V_r(m) = (S_r + \delta_{S_r}(m-1)) \times w_r(m),$$

where:
  m is the order number of the instant $to_j$;
  $V_r(m)$ is the measured speed $V_r$ at the instant $t_m$;
  $S_r$ is the constant scale factor;
  $\delta_{S_r}(m-1)$ is the correction coefficient of the scale factor $S_r$ updated at the previous instant $t_{m-1}$;
  $w_r(m)$ is the angular speed measured by the odometer 18 acquired at the instant $t_m$;
  the symbol "×" is the symbol of the scalar multiplication.

The speed $V_r(m)$ is an average speed over the interval $[to_{j-1}, to_j]$, since the measured angular speed $w_r(m)$ is an average angular speed of the wheel 3 over this same interval.

The estimate $\hat{z}_m$ of the speed $V_r(m)$ is constructed using the following relation (4):

$$\hat{z}_m = \frac{1}{N+1} \sum_{l=k-N}^{k} f_{odo}(P(l), O(l), V(l))$$

where:
  k is the order number of the instant $t_k$ equal to the instant $t_m$ in the series $\{0, t_1, t_2, \ldots, t_{k-1}, t_k, \ldots\}$;
  N is equal to the number of instants $t_k$ included in the interval; and
  $f_{odo}(\ldots)$ is an observation function that returns an estimate $V_{odo}(k)$ of the instantaneous speed of the wheel 3 at an instant $t_k$ as a function of the estimates $P(k)$, $O(k)$ and $V(k)$ delivered on the output 7 for this instant $t_k$.

In this case, the estimate $\hat{z}_m$ is therefore equal to the algebraic mean of the estimates $V_{odo}(k)$ of the instantaneous speeds of the wheel 3 at each of the instants $t_k$ included in the interval $[to_{j-1}; to_j]$.

In this embodiment, the function $f_{odo}$ is defined, for example, by the following relation (5):

$$V_{odo}(k) = f_{odo}(P(k), O(k), V(k)) = u_x(C_b^e(k)V(k) - w_{eb}^b \wedge P_{ob}^b)$$

where:
- $u_x$ is a projection vector of the speed on the axis $x_b$, equal to [1 0 0];
- $C^e{}_b(k)$ is a 3×3 rotation matrix defining the orientation of the coordinate system $R_b$ in relation to the coordinate system $R_T$. This matrix is computed for each instant $t_k$ on the basis of the orientation $O_c(k)$;
- $V(k)$ is a three-coordinate vector defining the speed of the unit 12 at the instant $t_k$ in relation to the coordinate system $R_T$ and expressed in the coordinate system $R_T$;
- $w^b{}_{eb}$ is a three-coordinate vector defining the angular speed of the unit 12 at the instant $t_k$ in relation to the coordinate system $R_T$ and expressed in the coordinate system $R_b$;
- $I^b{}_{ob}$ is the three-coordinate vector defining the lever arm between the contact point of the wheel 3 with the ground and the unit 12, expressed in the coordinate system $R_b$; and
- the symbol "∧" denotes the vector product operation.

The position of the contact point, between the wheel 3 and the ground on which it runs, in relation to the unit 12 is coded in the three-coordinate vector $I^b{}_{ob}$ expressed in the coordinate system $R_b$. This vector $I^b{}_{ob}$ extends from a point located at the site of the unit 12 to a point located at the site of the contact point between the wheel 3 and the ground. The norm of the vector $I^b{}_{ob}$ is therefore equal to the distance that separates the unit 12 from this contact point. This vector $I^b{}_{ob}$ is known as "lever arm". As a first approximation, this vector $I^b{}_{ob}$ is considered to be constant and known.

The innovation $Y_m$ is obtained using the following relation (6):

$$Y_m = V_r(m) - \hat{z}_m.$$

Typically, the block 40 corrects the prediction $X_{m|m-1}$ by adding the innovation $Y_m$ multiplied by the Kalman gain $K_m$ thereto. The gain $K_m$ is computed using the following relation (7):

$$K_m = P_{m|m-1} H_m^T (H_m P_{m|m-1} H_m^T + R_m)^{-1},$$

where:
- the matrix $R_m$ is the covariance matrix of the noise on the measurements of the odometer 18; and
- $H_m$ is an observation matrix.

The observation matrix $H_m$ is a function of the partial derivative of the relation (4) in relation to the various parameters of the state vector $X_{m|m}$. The computation of this matrix $H_m$ is described in detail with reference to FIG. 3.

Subsequently, the state vector $X_{m|m}$ is obtained using the following relation (8):

$$X_{m|m} = X_{m|m-1} + K_m Y_m.$$

The updated covariance matrix of the error at the instant $t_m$ is computed using the following relation (9):

$$P_{m|m} = (I - K_m H_m) P_{m|m-1},$$

where I is the identity matrix.

The matrix $P_{m|m}$ contains the margins of error on the estimates of the correction coefficients.

In this particular embodiment, the adder 36 is a simple adder that adds the corresponding correction coefficients contained in the state vector $X_{m|m}$ to the position $P_e(k)$, the orientation $O_e(k)$ and the speed $S_e(k)$.

Subsequently, the adder 36 delivers, on the output 7, the corrected position $P_c(k)$, orientation $O_c(k)$ and speed $V_c(k)$ thus obtained.

Figure 3:
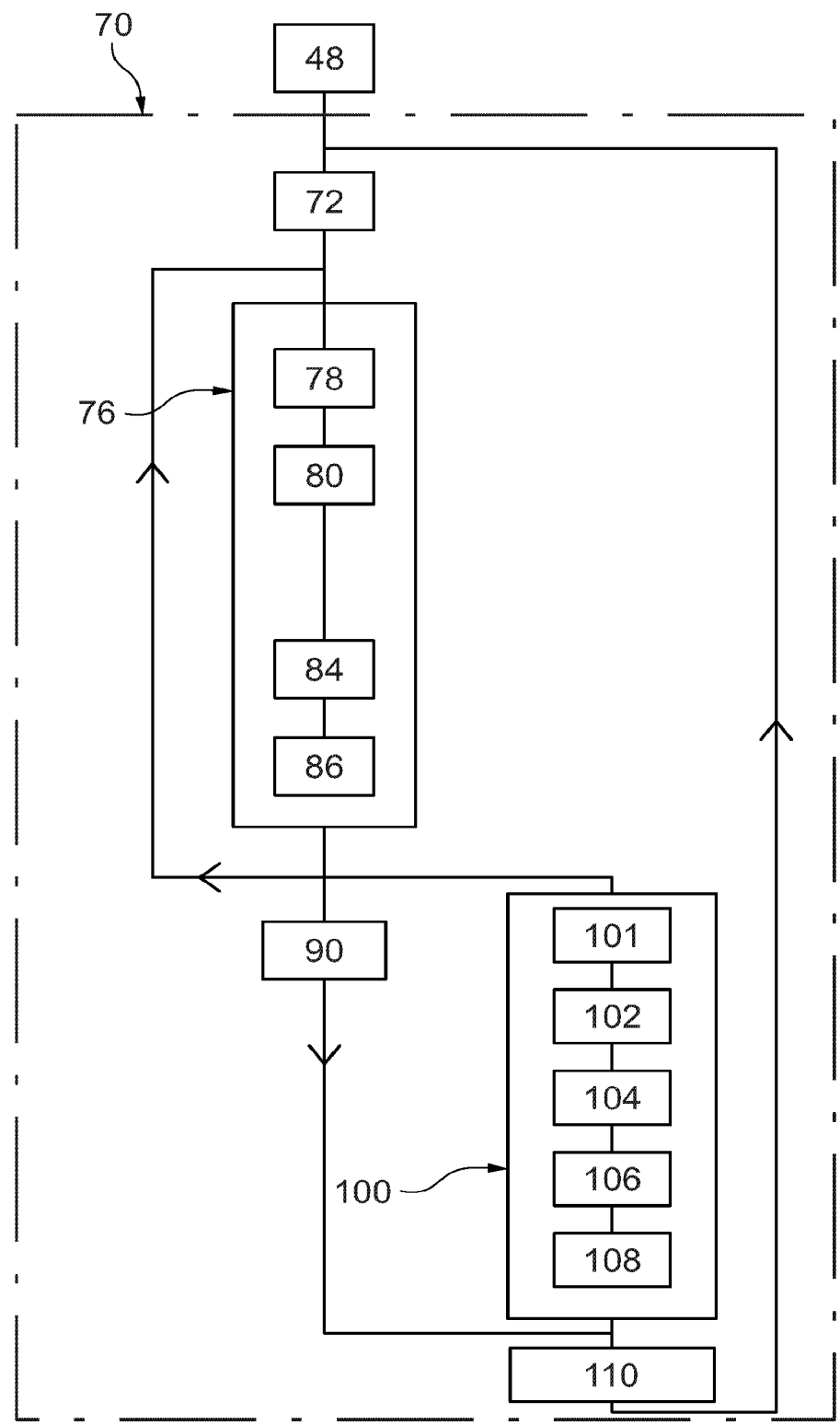
FIG. 3 is a flowchart of a method for determining the position and the orientation of a vehicle using the system of FIG. 1.

The operation of the system 6 will now be described with reference to the method of FIG. 3.

The method begins with a phase 48 of initializing the system 6. This phase 48 begins immediately after the activation of the system 6, i.e. typically just after it has been turned on. During this phase 48, the various variables and parameters required to execute the module 26 are initialized. For example, the initial values of the position, of the speed and of the orientation of the vehicle 2, of the scale factor $S_r$, and of the correction coefficients are initialized. Numerous algorithms exist that allow these initial values to be obtained rapidly. Such algorithms are described, for example, in chapter 14 of the following book: P. Groves: "*Principles of GNSS, Inertial and multisensor integrated navigation systems $2^{nd}$ edition*", Artech House, 2013. Hereafter, this book is referred to as "Groves2013".

Once the initialization phase 48 is complete, a phase 70 of executing the module 26 begins.

The phase 70 begins with a step 72 of initializing various accumulation variables. In this example, there are three accumulation variables and they are denoted $V_{moy}$, $H_{moy}$ and $N_{moy}$. The variables $V_{moy}$ and $N_{moy}$ are scalar variables. The variable $H_{moy}$ is a matrix of one row and of sixteen columns. During step 72, the variables $V_{moy}$ and $N_{moy}$ are set to zero and all the coefficients of the matrix $H_{moy}$ are also set to zero.

Subsequently, during a step 76, each time that new measurements of the unit 12 are acquired by the computer 20, the module 26 updates the position, the orientation and the speed of the vehicle 2. Thus, this updating is carried out for each instant $t_k$.

More specifically, step 76 comprises an operation 78, during which the accelerometer 14 and the gyrometer 16 respectively measure the acceleration and the angular speed of the vehicle 2, and these new measurements are acquired by the computer 20 at the instant $t_k$.

Subsequently, during an operation 80, the sub-module 30 constructs the rough estimates $P_e(k)$, $O_e(k)$ and $V_e(k)$ on the basis of:
- the previous position $P(k-1)$, the previous orientation $O(k-1)$ and the previous speed $V(k-1)$; and
- measurements of the accelerometer 14 and of the gyrometer 16 acquired at the instant $t_k$.

Subsequently, during an operation 84, the sub-module 30 also constructs the estimate $V_{odo}(k)$ of the instantaneous speed of the wheel 3 at the instant $t_k$ only on the basis of the position $P(k)$, of the orientation $O(k)$ and of the speed $V(k)$ obtained on completion of the operation 80. To this end, the sub-module 30 uses the previously described relation (5).

During operation 84, the sub-module 30 also constructs an observation matrix $H_{odo}(k)$ of the instantaneous speed of the wheel 3. The matrix $H_{odo}(k)$ is a matrix that allows the observation matrix $H_m$ used to compute the gain $K_m$ to be constructed. This matrix $H_{odo}(k)$ has the same dimensions as the matrix $H_m$. Thus, in this case, it is a row comprising sixteen coefficients. Hereafter, these coefficients are numbered from 1 to 16 from left-to-right and are respectively denoted $H_{odo}(k)_p$, where the index p is the order number of the coefficient in this row. In this case, the matrix $H_{odo}(k)$ is the derivative, at the instant $t_k$, of the observation function $f_{odo}(P(k), O(k), V(k))$ in relation to each of the state variables of the state vector.

In this particular embodiment, the coefficients of the matrix $H_{odo}(k)$ are computed as follows.

The coefficients 1 to 3 of the matrix $H_{odo}(k)$ are computed using the following relation (10):

$$[H_{odo}(k)_1, H_{odo}(k)_1, H_{odo}(k)_3]^T = [1\ 0\ 0] C^e{}_b{}^T [V(k) \wedge]$$

where the matrix [V(k)∧] is defined by the following relation (11):

$$[V(k)\wedge] = \begin{bmatrix} 0 & -Vz(k) & Vy(k) \\ Vz(k) & 0 & -Vx(k) \\ -Vy(k) & Vx(k) & 0 \end{bmatrix}$$

where Vx(k), Vy(k) and Vz(k) are the coordinates of the speed V(k).

The coefficients 4 to 6 of the matrix $H_{odo}(k)$ are computed using the following relation (12):

$$[H_{odo}(k)_4, H_{odo}(k)_5, H_{odo}(k)_6]^T = [1\ 0\ 0]C_b^{e\,T}$$

The coefficients 7 to 15 of the matrix $H_{odo}(k)$ are zero.
The coefficient 16 of the matrix $H_{odo}(k)$ is computed using the following relation (13):

$$H_{odo}(k)_{16} = V_{odo}(k)$$

During an operation 86, the sub-module 30 accumulates the values computed during operation 84 in the variables $V_{moy}$, $H_{moy}$ and $N_{moy}$. To this end, the sub-module 30 implements the following relations:

$$V_{moy} = V_{moy} + V_{odo}(k), \qquad \text{relation (14)}$$

$$H_{moy} = H_{moy} + H_{odo}(k); \qquad \text{relation (15)}$$

$$N_{moy} = N_{moy} + 1. \qquad \text{relation (16)}$$

In the above relations, the variables $V_{moy}$, $H_{moy}$ and $N_{moy}$ to the right of the "=" sign correspond to the values of these variables before the above relations have been implemented. The relation (15) corresponds to a matrix addition.

Subsequently, only if the instant $t_k$ is also an instant $tg_i$ where a measurement of the unit 10 is acquired, the computer 20 executes a step 90 of updating correction coefficients as a function of the new measurement of the unit 10. This operation is carried out conventionally and therefore is not described. During this step 90, the correction coefficients are updated without using the measurement of the odometer 18.

Only if the instant $t_k$ is also an instant $to_j$ where a measurement of the odometer 18 is acquired, after step 76, the computer 20 executes a step 100 of updating correction coefficients as a function of the new measurement of the odometer 18. During this step 100, the correction coefficients are updated without using the measurement of the unit 10.

If the instant $t_k$ corresponds neither to an instant $tg_i$ nor to an instant $to_j$, then the position $P_e(k)$, the orientation $O_e(k)$ and the speed $V_e(k)$ estimated by the sub-module 30, and not corrected by the sub-module 32, are delivered on the output 7. Thus, at the instants $t_k$ located between the instants $t_m$, it is the position $P_e(k)$, the orientation $O_e(k)$ and the speed $V_e(k)$ that are delivered on the output 7. Furthermore, the method returns to step 76 without executing either step 90 or step 100. In this case, the previous position, the previous orientation and the previous speed used during the next iteration of step 76 are respectively equal to the position $P_e(k)$, the orientation $O_e(k)$ and the speed $V_e(k)$.

During step 100, the sub-module 32 begins by acquiring, during an operation 101, a new measurement from the odometer 18.

Subsequently, during an operation 102, the block 38 is executed by the computer 20 in order to obtain the predicted state vector $X_{m|m-1}$ on the basis of the previous estimate $X_{m-1|m-1}$ of this state vector. The previous estimate $X_{m-1|m-1}$ is that obtained at the previous instant $t_{m-1}$. The previous instant $t_{m-1}$ corresponds either to an instant $tg_i$ or to the instant $to_{j-1}$. Therefore, the previous estimate $X_{m-1|m-1}$ is that which has been constructed either during the previous execution of step 90, or during the previous execution of step 100. The prediction $X_{m|m-1}$ of the state vector is constructed by implementing the relation (1). In this particular case where the filter 34 is an "Error-State Kalman Filter", the prediction $X_{m|m-1}$ is systematically zero.

During step 102, the block 38 also constructs the prediction $P_{m|m-1}$ of the covariance matrix $P_m$ at the instant $t_m$ by implementing the relation (2).

Subsequently, the block 40 is executed to correct the prediction $X_{m|m-1}$ obtained on completion of operation 102. To this end, during an operation 104, the block 40 constructs the measurement $V_r(m)$ of the speed $V_r$ of the wheel 3 on the basis of the angular speed $w_r(m)$ measured by the odometer 18. To this end, the block 40 uses the relation (3).

During an operation 106, the block 40 constructs the estimate $\hat{z}_m$ of the speed $V_r(m)$ on the basis of the measurements of the unit 12. To this end, in this embodiment, the block 40 computes the arithmetic mean of the estimates $V_{odo}(k)$ constructed, by the sub-module 30, for each instant $t_k$ included in the interval $[to_{j-1}, to_j]$. In this case, the estimate $\hat{z}_m$ is obtained by implementing the following relation (17):

$$\hat{z}_m = V_{moy}/N_{moy}.$$

In this embodiment, during operation 106, the block 40 also computes the observation matrix $H_m$. The matrix $H_m$ is equal to the arithmetic mean of the matrices $H_{odo}(k)$ constructed, by the sub-module 30, for each of the instants $t_k$ included in the interval $[to_{j-1}, to_j]$. In this case, the matrix $H_m$ is computed using the following relation (18):

$$H_m = H_{moy}/N_{moy}.$$

During the next operation 108, the block 40 updates the correction coefficients. To this end, it corrects the prediction $X_{m|m-1}$ as a function of the deviation $Y_m$ between the measurement $V_r(m)$ and its estimate $\hat{z}_m$. To this end, the block 40 computes the deviation $Y_m$ according to the relation (6). Subsequently, the gain $K_m$ is computed using the relation (7). Thus, in this embodiment, the gain $K_m$ is computed using an arithmetic mean of the matrices $H_{odo}(k)$. The corrected state vector $X_{m|m}$ is then obtained by implementing the relation (8).

During operation 108, the block 40 also obtains the covariance matrix $P_{m|m}$ updated using the relation (9).

On completion of steps 90 and 100, during a step 110, the sub-module 32 corrects the position $P_e(m)$, the orientation $O_e(m)$ and the speed $V_e(m)$ in order to obtain the corrected position $P_c(m)$, the corrected orientation $O_c(m)$ and the corrected speed $V_c(m)$.

To this end, the adder 36 adds the correction coefficients contained in the vector $X_{m|m}$ to the corresponding coordinates of the position $P_e(m)$, of the orientation $O_e(m)$ and of the speed $V_e(m)$, constructed during the execution of operation 80, in order to obtain the position $P_c(m)$, the orientation $O_c(m)$ and the speed $V_c(m)$. Thus, only at the instants $t_m$, it is the position $P_c(m)$, the orientation $O_c(m)$ and the speed $V_c(m)$ that are delivered on the output 7 and not the position $P_e(m)$, the orientation $O_e(m)$ and the speed $V_e(m)$. Furthermore, in step 110, the position P(k), the orientation O(k) and the speed V(k) are transmitted to the sub-module 30 and used by the sub-module 30 as the previous position, previous orientation and previous speed of the vehicle 2 during the next iteration of step 76.

After step 110, the method returns to step 72.

Figure 4:
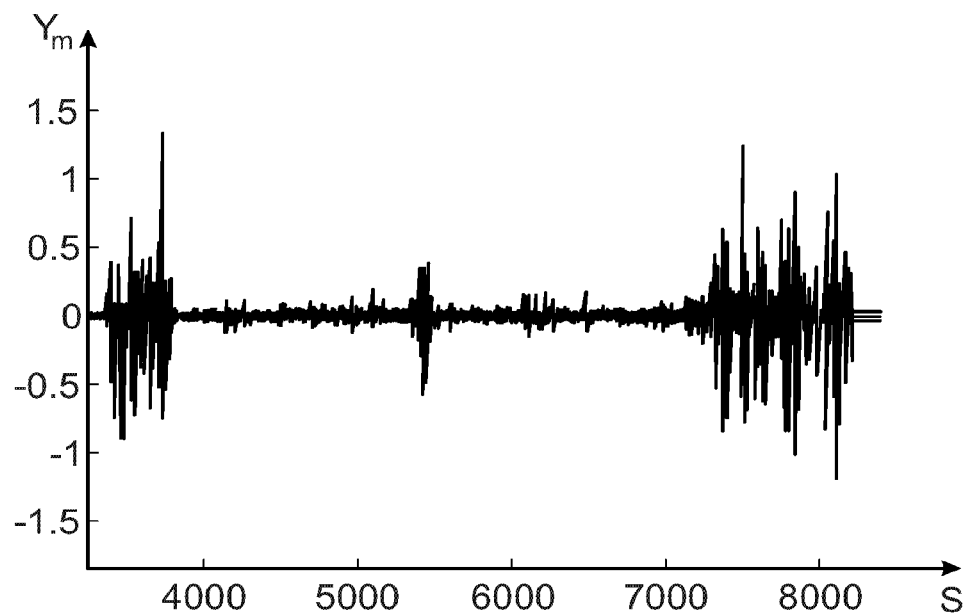
FIGS. 4 and 5 are graphs illustrating the evolution over time of a deviation used to correct the position and the orientation determined for the vehicle.

The graph of FIG. 4 represents the evolution of the innovation $Y_m$ over time in a location system identical to the system 6, except that the estimate $\hat{z}_m$ of the speed $V_r(m)$ is taken as equal to $V_{odo}(m)$ and is not constructed using the relation (4). Taking the estimate $\hat{z}_m$ of the speed $V_r(m)$ as equal to $V_{odo}(m)$ corresponds to the practices of the prior art. For example, this is the teaching found in chapter 16 of the Groves2013 book. In other words, in the prior art, the angular speed measured by the odometer 18 is processed as if it were an instantaneous angular speed of the wheel 3 at the instant to$_j$.

Figure 5:
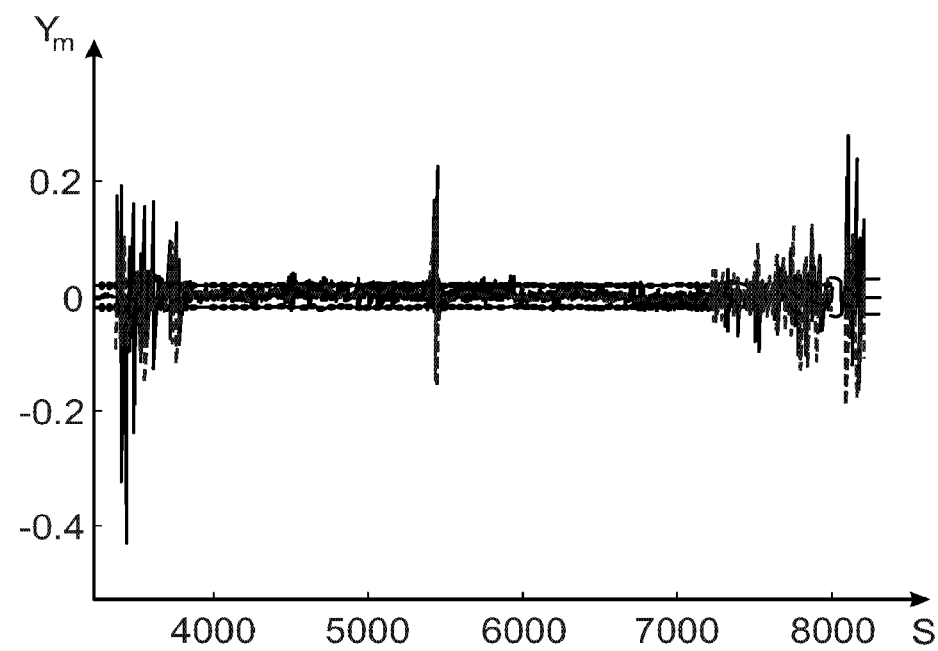

The graph of FIG. 5 represents the evolution of the innovation $Y_m$ over time in the system 6 for the same movements of the vehicle 2 as those taken into account to establish the graph of FIG. 4. The graph of FIG. 5 shows that, in the same operating conditions, the innovation $Y_m$ computed by the system 6 is significantly smaller than that illustrated on the graph of FIG. 4. The fact that the innovation $Y_m$ is smaller allows the precision of the position and of the orientation delivered by the location system to be improved. In other words, by taking into account the fact that the angular speed measured by the odometer 18 is an average angular speed on the interval [to$_{j-1}$, to$_j$], and not an instantaneous angular speed, the precision of the location system is improved.

Chapter II: Variants

Variants of the Kalman Filter:

Numerous other embodiments of the filter 34 are possible. For example, the filter 34 can be a linear Kalman filter, an extended Kalman filter (EKF), a UKF ("Unscented Kalman Filter") filter or even an adaptive Kalman filter.

There are numerous variants of the relations implemented in the Kalman filter. Indeed, these relations depend on the coordinate system in which the position, the orientation and the speed of the vehicle are expressed. However, other coordinate systems can be used instead of the coordinate system $R_T$. For example, the ECI (Earth-Centered Inertial) coordinate system can be cited. The ECI coordinate system is not fixed in relation to the surface of the earth, since the earth rotates in this coordinate system. The coordinate system $R_T$ also can be a coordinate system that is fixed in relation to the stars. When another coordinate system is used, it is possible, simply by changing coordinate system, to return to the situation described herein.

The relations of the Kalman filter can also contain an additional rotation matrix for taking into account the fact that the measurement axes of the unit 12 are not aligned on the axes of the coordinate system $R_b$.

Similarly, numerous variants of the state vector $X_{m|m}$ are possible. For example, when the diameter of the wheel 3 does not vary, the correction coefficient $\delta_{S_r}(m)$ is omitted. The state vector $X_{m|m}$ also may not comprise a correction coefficient of the biases of the accelerometer 14 and of the gyrometer 16. The state vector $X_{m|m}$ can also comprise additional state variables.

The previous teaching in the particular case where the correction sub-module 32 uses one or more Kalman filter(s) also applies to correction sub-modules that construct the correction coefficients using estimators other than Kalman filters. In general, the description provided herein is applicable to any correction sub-module configured to update the correction coefficients using a deviation between:

a measurement of a physical quantity corrected on the basis of the average angular speed measured by an odometer; and an estimate of this physical quantity constructed on the basis of the measurements of the unit 12.

Other embodiments of the sub-module 32 are possible. For example, as a variant, the sub-module 32 is arranged as described in the architecture known as the "tight coupling" architecture. This architecture is described in further detail in chapter 4.1.2 of the Godha2006 thesis.

Variants of the Method:

As a variant, it is possible that, at the same instant $t_m$, a new measurement of the unit 10 and a new measurement of the odometer 18 are acquired. In other words, as a variant, the instants tg$_i$ and to$_j$ can be concomitant. In this case, the computer 20 executes an update of the correction coefficients as a function both of the new measurements of the units 10 and of the odometer 18. For example, to this end, the computer 20 computes a new gain $K_m$ as a function of an observation matrix formed by the concatenation of the matrix $H_m$ and of the observation matrix used to update the correction coefficients as a function of the measurement of the unit 10.

Each instant $t_m$ is not necessarily equal to a respective instant $t_k$. As a variant, at least one of the instants $t_m$ falls between two instants $t_k$ and $t_{k+1}$. The previous description can also apply to this scenario where the instant $t_m$ is slightly earlier than the instant $t_{k+1}$. For example, to this end, the instant $t_m$ is processed as if it were equal to the instant $t_{k+1}$. Thus, the correction coefficients constructed on the basis of the measurements acquired at the instant $t_m$ are used to correct the estimates of the sub-module 30 carried out for the instant $t_{k+1}$. In this case, the instant $t_{k+1}$ is not equal to the instant $t_m$, but ranges between the instants $t_m$ and $t_{m+1}$.

Other embodiments of operation 84 are possible. For example, in a simplified embodiment, the lever arm $I^b_{ob}$ is neglected. Typically, this is equivalent to considering that the norm of the lever arm $I^b_{ob}$ is zero.

In another embodiment, the speed $V_{odo}(k)$ is constructed for only some of the instants $t_k$ included in the interval [to$_{j-1}$, to$_j$]. In this case, the estimate $\hat{z}_m$ is constructed solely on the basis of these constructed speeds $V_{odo}(k)$. This allows the number of computations executed by the sub-module 30 to be limited.

In a variant of operation 104, converting the angular speed $w_r(m)$ into speed $V_r(m)$ is carried out by the odometer and not by the sub-module 32. In this case, the sub-module 32 provides the odometer 18 with the scale factor $S_r$ and, optionally, the correction coefficient $\delta_{S_r}(m)$.

Other embodiments of operation 106 are possible. For example, as a variant, the wheel 3 is a wheel that can be turned in order to turn the vehicle, for example. In this case, the turning angle of the wheel 3 is taken into account in the coordinate system $R_b$ when constructing the estimate $\hat{z}_m$ on the basis of the measurements of the unit 12.

The sub-module 30 can also record in a memory all the speeds $V_{odo}(k)$ computed for each of the instants $t_k$ included in the interval [to$_{j-1}$, to$_j$]. Subsequently, during operation 106, the block 40 adds together the various stored speeds $V_{odo}(k)$, then divides the result of this addition by $N_{moy}$. In this case, the addition of the various speeds $V_{odo}(k)$ is carried out by the block 40 and not by the sub-module 30.

The various variants described above for constructing the estimate $\hat{z}_m$ can be transferred to the construction of the matrix $H_m$.

In a simplified variant, the matrix $H_m$ is taken as equal to the matrix $H_{odo}(m)$ computed at the instant $t_m$ by the sub-module 30. In this case, the variable $H_{moy}$ is no longer useful.

In another embodiment, the speed $V_{odo}(k)$ or the speed $V_r(m)$ is added to the state vector of the Kalman filter and the state and observation matrices are modified as a result. However, such an embodiment then requires executing the Kalman filter at each instant $t_k$, which is not always desirable.

In the previously described embodiments, the physical quantity, for which the measurement is constructed on the basis of the measurement of the odometer 18, is the speed $V_r$ of the wheel 3. However, the teaching in this particular case is applicable to any physical quantity for which the measurement is constructed on the basis of the measurement of the odometer 18. For example, as a variant, the physical quantity is the speed of the unit 12. In this case, each time the computer 20 acquires a new measurement from the odometer 18, this measurement is converted into a speed of the unit 12 and not simply into a speed of the wheel 3. The physical quantity also directly can be the angular speed of the wheel 3.

The physical quantity also can be something other than a speed. For example, the physical quantity can be an average distance $Dmo_j$ covered during each interval $[t_{k-1}; t_k]$ within the interval $[to_{j-1}; to_j]$. This average distance $Dmo_j$ is constructed on the basis of the new measurement of the odometer 18, for example, using the following relation: $Dmo_j=V_r(m)\cdot T$, where $V_r(m)$ is the speed constructed at the instant $to_j$ using the relation (3) and T is the duration of each interval $[t_{k-1}; t_k]$. The instantaneous values of this average covered distance are the distances covered during each interval $[t_{k-1}; t_k]$. In this case, the instantaneous value $D_k$ at the instant $t_k$ is computed, for example, using the following relation: $D_k=V_e(k)\cdot T$, where $V_e(k)$ is the speed estimated at the instant $t_k$ on the basis of the measurements of the inertial navigation unit 12. Similarly, the physical quantity can be the average position, in the direction $x_b$, occupied by the vehicle during the interval $[to_{j-1}; to_j]$. This average position $Pmo_j$ is, for example, obtained using the following relation: $Pmo_j=P(to_{j-1})+V_r(m)\cdot T/2$. This average position also can be estimated by computing the arithmetic mean of the instantaneous positions $P(k)$ of the vehicle, in the direction $x_b$, at the various instants $t_k$ included in the interval $[to_{j-1}; to_j]$.

As a variant, the physical quantity is not equal to an average of several instantaneous values of the same physical quantity at instants $t_k$ included in the interval $[to_{j-1}; to_j]$. For example, the physical quantity is equal to the sum of the instantaneous values of this physical quantity for various instants included in the interval $[to_{j-1}; to_j]$. By way of an illustration of such a variant, the physical quantity is the distance $Do_j$ covered during the interval $[to_{j-1}; to_j]$. This distance $Do_j$ is constructed on the basis of the new measurement of the odometer 18, for example, using the following relation: $Do_j=V_r(m)\cdot T_j$, where $V_r(m)$ is the speed constructed at the instant $to_j$ using the relation (3) and $T_j$ is the duration of the interval $[to_{j-1}; to_j]$. The instantaneous values of this covered distance are the distances covered during each interval $[t_{k-1}; t_k]$. In this case, the instantaneous value $D_k$ at the instant $t_k$ is computed, for example, using the following relation: $D_k=V_e(k)\cdot T_k$, where $V_e(k)$ is the speed estimated at the instant $t_k$ on the basis of the measurements of the inertial navigation unit 12 and $T_k$ is the duration of the interval $[t_{k-1}; t_k]$. An estimate of the distance $Do_j$ is then obtained by accumulating the distances $D_k$ constructed for all the instants $t_k$ included in the interval $[to_{j-1}; to_j]$. In this case, constructing the estimate of the distance $Do_j$ does not require the computation of an average of instantaneous values, but only requires a sum of these instantaneous values.

Thus, the physical quantity can be any physical quantity for which the value constructed on the basis of the measurement of the odometer 18 is proportional to the sum of the instantaneous values of said physical quantity for various instants included in the interval $[to_{j-1}; to_j]$. Typically, as illustrated herein, this physical quantity is therefore equal to the average or to the sum of the instantaneous values of this physical quantity for various instants included in the interval $[to_{j-1}; to_j]$.

Variants of the Location System:

As a variant, the system 6 is equipped with additional sensors such as, for example, a magnetometer or a barometer. In this case, the correction sub-module 32 is modified to take into account the measurements of these additional sensors in order to correct the rough estimates delivered by the integration sub-module 30.

The system 6 can also comprise a plurality of odometers each measuring the speed of a respective wheel of the vehicle 2. In this case, the previous description applies to each odometer of the vehicle 2.

In another embodiment, the unit 10 is omitted. In this case, for example, the correction coefficients are updated solely on the basis of the measurements of the odometer 18.

Other Variants:

The system 6 described herein can be used in any vehicle that runs on the ground and for which one of the wheels in contact with the ground is equipped with an odometer. Thus, the vehicle also can be a train, for example.

In a simplified embodiment, the system 2 does not deliver the speed of the vehicle 2. In this case, the module 26 can be simplified.

Chapter III: Advantages of the Described Embodiments

The location system described herein allows the position and the orientation of the vehicle 2 to be determined more precisely. This improvement is due to the fact that, in order to determine the position and the orientation of the vehicle, the system uses the deviation between:

a measurement of a physical quantity constructed on the basis of the measurement of the odometer 18; and an arithmetic mean or a sum of several estimates of the instantaneous value of said physical quantity constructed on the basis of measurements of the inertial navigation unit 12.

In other words, the location system described herein takes into account the fact that the measurement delivered by the odometer is an average measurement over the interval $[to_{j-1}, to_j]$. This ultimately results in precision and orientation of the vehicle 2 that is more precise.

The fact that the instantaneous value $V_{odo}(k)$ of the physical quantity is constructed between the instants $to_{j-1}$ and $to_j$ by the integration sub-module 30 allows the block 40 to be executed at a frequency that is less than the execution frequency of the sub-module 30. This therefore allows computer and energy resources to be saved.

The use of the matrix $H_m$, which is an average matrix of the various matrices $H_{odo}(k)$ constructed between the instants $to_{j-1}$ and $to_j$, allows the correction coefficients to be corrected even more precisely, and therefore allows the precision of the determined position and orientation to be further improved.

Using both the measurements of the odometer 18 and of the satellite geolocation unit 10 for determining the position and the orientation of the vehicle also allows the precision of the geolocation system to be improved.

The invention claimed is:

1. A location system, configured to be mounted on a vehicle, for determining a position and an orientation of the vehicle, comprising:

an inertial navigation unit containing an accelerometer and a gyrometer configured to measure an acceleration and an angular speed of the vehicle at each instant $t_k$ of a temporally ordered series of instants $\{0, t_1, t_2, \ldots, t_{k-1}, t_k, \ldots \}$;

an odometer configured to measure an angular speed of a wheel of the vehicle around its axis of rotation at each instant $to_j$ of a temporally ordered series of instants $\{0, to_1, to_2, to_{j-1}, to_j, \ldots \}$, said angular speed measured at the instant $to_j$ being an average angular speed of the wheel in an interval $[to_{j-1}, to_j]$, a frequency of the instants $to_j$ being less than a frequency of the instants $t_k$, so that several instants $t_k$ are interspersed between immediately consecutive instants $to_{j-1}$ and $to_j$; and an electronic computer configured to determine the position and the orientation of the vehicle on a basis of the measurements of the accelerometer, of the gyrometer and of the odometer, wherein the electronic computer is configured to execute a method comprising:

acquiring using the electronic computer, at each instant $t_k$ of the temporally ordered series of instants $\{0, t^1, t^2, \ldots, t_{k-1}, t_k, \ldots \}$, a measurement of the acceleration and of the angular speed of the vehicle carried out by the inertial navigation unit;

constructing using an inertial measurement integration module, for each instant $t_k$, an estimated position and orientation of the vehicle on a basis of a previous position and of a previous orientation of the vehicle and using the measurements of the acceleration and of the angular speed acquired at the instant $t_k$;

acquiring, at each instant tot of the temporally ordered series of instants $\{0, to_1, to_2, \ldots, to_{j-1}, to_j, \ldots \}$, a new measurement of an angular speed of a wheel of the vehicle around its axis of rotation, with the angular speed acquired at the instant $to_j$ being an average angular speed of the wheel in an interval $[to_{j-1}, to_j]$ delivered by an odometer, the frequency of the instants $to_j$ being less than the frequency of the instants $t_k$, so that several instants $t_k$ are interspersed between immediately consecutive instants $to_{j-1}$ and $to_j$; and for each instant $to_j$:

constructing a measurement of a physical quantity on a basis of the average angular speed acquired at the instant $to_j$, with the physical quantity being proportionate to a sum of instantaneous values of the physical quantity between the instants $to_{j-1}$ and $to_j$; and constructing an estimate of the physical quantity at the instant $to_j$ on a basis of the measurements carried out by the inertial navigation unit and without using the measurement of the average angular speed acquired at the instant $to_j$; then computing a deviation between the measurement and the estimate of the physical quantity at the instant $to_j$; and correcting using a correction module, as a function of the deviation computed for the instant $to_j$, estimated positions and orientations for an instant $t_k$ equal to or subsequent to the instant $to_j$, in order to obtain a corrected position and a corrected orientation;

wherein the method also comprises:

for several instants $t_k$ ranging between the instants $to_{j-1}$ and $to_j$, constructing an estimate of the instantaneous value of the physical quantity on a basis of the measurements of the inertial navigation unit acquired at the instant $t_k$; then constructing the estimate of the physical quantity for the instant $to_j$ on a basis of a sum of the instantaneous values constructed for the instants $t_k$ ranging between the instants $to_{j-1}$ and $to_j$.

2. The system according to claim 1, wherein the estimate of the physical quantity constructed for the instant to; is obtained by executing one of the computations included in a group made up of:

a computation of an arithmetic mean of the instantaneous values constructed for the instants $t_k$ ranging between the instants $to_{j-1}$ and $to_j$; and a computation of the sum of the instantaneous values constructed for the instants $t_k$ ranging between the instants $to_{j-1}$ and $to_j$.

3. The system according to claim 1, wherein:

for each instant $to_j$, the correction module updates correction coefficients of the position and of the orientation estimated by the integration module, as a function of the deviation computed for the instant $to_j$, said correction coefficients then no longer being updated as a function of a deviation computed on a basis of the angular speed measured by the odometer until the next instant $to_{j+1}$; then the correction module uses the updated correction coefficients for the instant $to_j$ to correct the positions and orientations estimated by the integration module for an instant $t_k$ equal to the instant $to_j$ or ranging between the instants $to_j$ and $to_{j-1}$; and for several instants $t_k$ ranging between the instants $to_j$ and $to_{j+1}$, the integration module constructs the estimate of the instantaneous value of the physical quantity at the instant $t_k$ by using the measurements of the acceleration and of the angular speed acquired at this instant $t_k$.

4. The system according to claim 3, wherein, at each instant $to_j$, the updating of the correction coefficients of the position and of the orientation estimated by the integration module, as a function of the deviation computed tier the instant $to_j$, is carried out by executing a Kalman filter, a state vector of which comprises the correction coefficients.

5. The system according to claim 4, wherein:

for several instants $t_k$ ranging between the instants $to_{j-1}$ and $to_j$, the integration module constructs an observation matrix of the instantaneous value of the physical quantity at this instant $t_k$, on a basis of the measurements of the acceleration and of the angular speed acquired at this instant $t_k$; then the estimate of the physical quantity constructed for the instant $to_j$ is obtained by executing a computation of the arithmetic mean of the instantaneous values constructed for the instants $t_k$ ranging between the instants $to_{j-1}$ and $to_j$;

for the instant $to_j$, the correction module:

computes an observation matrix of a mean value of the physical quantity by computing an arithmetic mean of the observation matrices of the instantaneous value of the physical quantity constructed for the instants $t_k$ ranging between the instants $to_{j-1}$ and $to_j$; then computes a gain of the Kalman filter on a basis of the observation matrix of the mean value of the physical quantity; then updates the correction coefficients as a function of the computed gain.

6. The system according to claim 4 wherein the Kalman filter is an ESKF (Error-State Kalman Filter) filter.

7. The system according to claim 1, wherein the physical quantity is a linear speed of the wheel of the vehicle.

8. The system according to claim 1, wherein the electronic computer is further configured to execute:

acquiring, at each instant $tg_i$ of a temporally ordered series of instants $\{0, tg_1, tg_2, \ldots, tg_{i-1}, tg_i, \ldots\}$, a measurement of the position or of the speed of the vehicle carried out by a satellite geolocation unit;

computing, for each instant $tg_i$, a deviation between the measured position or the measured speed acquired at the instant $tg_i$ and, respectively, a position or a speed estimated by the integration module for said instant $tg_i$, without taking into account the measurement of the satellite geolocation unit acquired at this instant $tg_i$; then the correction module correcting, as a function of the deviation computed for the instant $tg_i$, estimated positions and orientations for an instant $t_k$ equal or subsequent to the instant $tg_i$, in order to obtain a corrected position and a corrected orientation.

9. The system according to claim 1, wherein the instantaneous values of the physical quantity are chosen from:

instantaneous values of a linear speed of the wheel of the vehicle, instantaneous values of a speed of the inertial navigation unit, instantaneous values of the angular speed of the wheel, instantaneous values of distances covered during each interval $[t_{k-1}; t_k]$, and instantaneous values of positions of the vehicle in a direction oriented and pointing in the direction towards which the vehicle moves when it moves forward.

* * * * *